United States Patent [19]
Vos

[11] Patent Number: 4,732,138
[45] Date of Patent: Mar. 22, 1988

[54] CAMPFIRE COOKER

[76] Inventor: Robert B. Vos, 8066 Carriage La., Unit 1, Cordova, Tenn. 38018

[21] Appl. No.: 20,020

[22] Filed: Feb. 27, 1987

[51] Int. Cl.⁴ ............................................. F24B 3/00
[52] U.S. Cl. .................................. 126/25 A; 126/9 R; 126/25 AA; 126/30; 99/450
[58] Field of Search .............. 126/9 R, 9 B, 20, 25 R, 126/25 A, 29, 30, 25 AA; 99/339, 450, 393; 245/163.2, 165, 166, 168

[56] References Cited

U.S. PATENT DOCUMENTS

| | | | |
|---|---|---|---|
| 918,070 | 4/1909 | Menge | 126/29 |
| 2,573,988 | 11/1951 | Saltzberg | 126/25 A X |
| 3,013,550 | 12/1961 | Murchie | 126/25 A |
| 3,131,685 | 5/1964 | Bergfield | 126/25 AA |
| 3,359,963 | 12/1967 | Kostial | 126/9 R |
| 3,494,349 | 2/1970 | Allen | 126/25 R |
| 4,120,280 | 10/1978 | Iverson et al. | 126/30 |
| 4,146,010 | 3/1979 | Manska | 126/30 |
| 4,548,193 | 10/1985 | Marogil | 126/30 |

FOREIGN PATENT DOCUMENTS

| | | | |
|---|---|---|---|
| 1090669 | 12/1980 | Canada | 126/30 |
| 2721615 | 11/1978 | Fed. Rep. of Germany | 126/25 AA |
| 2560030 | 8/1985 | France | 126/25 R |
| 12666 | of 1891 | United Kingdom | 126/30 |

*Primary Examiner*—Margaret A. Focarino
*Attorney, Agent, or Firm*—John Remon Wenzel

[57] ABSTRACT

A campfire cooker assembly including a tripod and grill structure, a fire bowl and a smoker. Each component may be used alone. The fire bowl may be used with the tripod and grill or the smoker. An additional grill for the tripod and grill structure may be used. Several forms of adjustable stable grill supports are disclosed. The fire bowl includes a surrounding concentric ring structure for support of articles and for safety. The grill may be rotated by a suitable motor. The smoker includes a protected water pan structure and may have several grills rotated by a motor. Accessory items include a wind screen, cutting board and solid or mesh cooking segments placed on the grill. The legs of the tripod and grill structure may be received in a ground supported ring. A cover may be provided for the fire bowl to smother a fire in the bowl and provide a protective rain shield.

38 Claims, 26 Drawing Figures

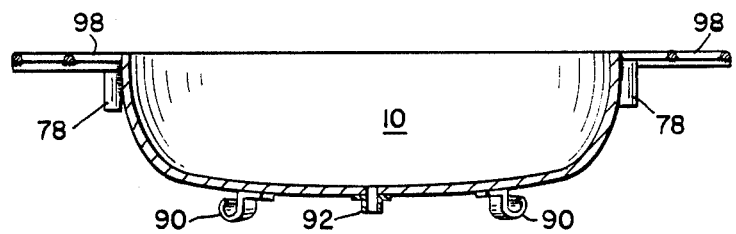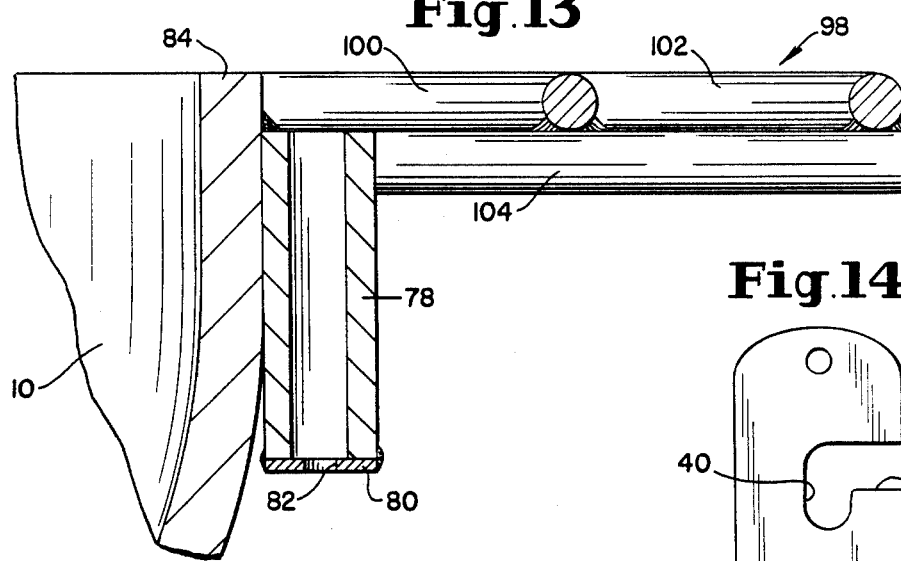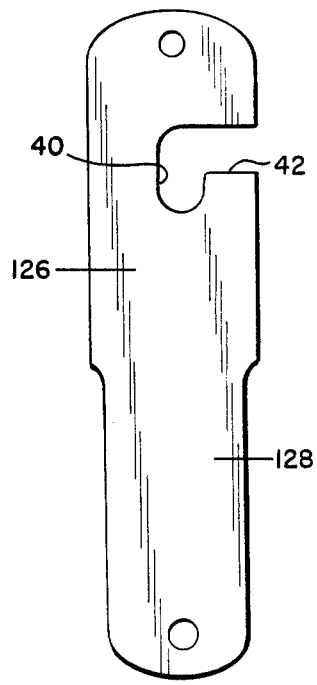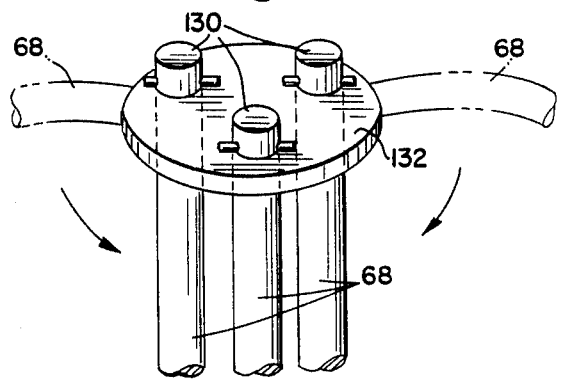

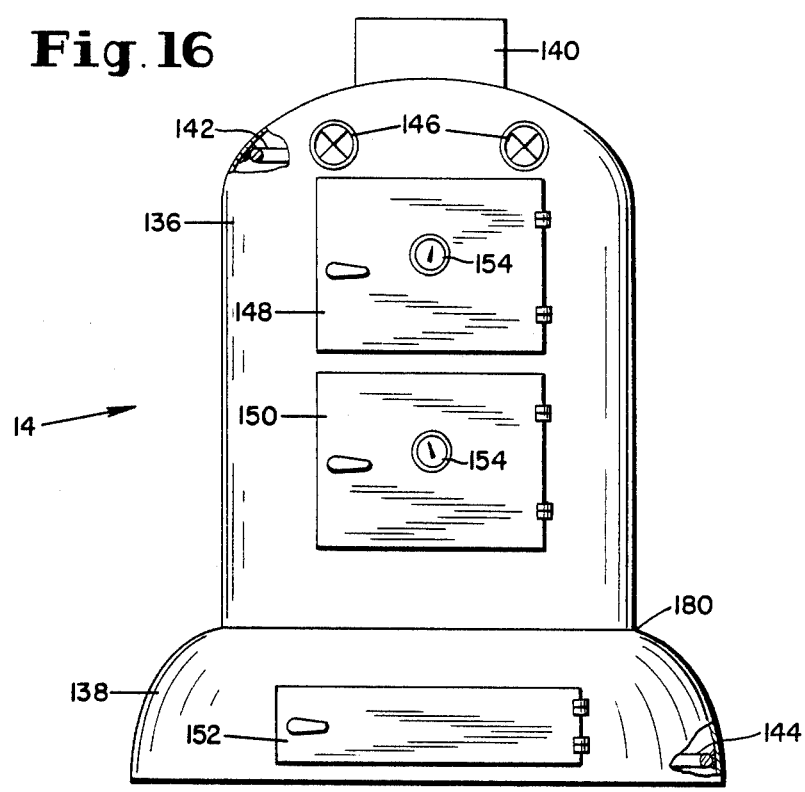
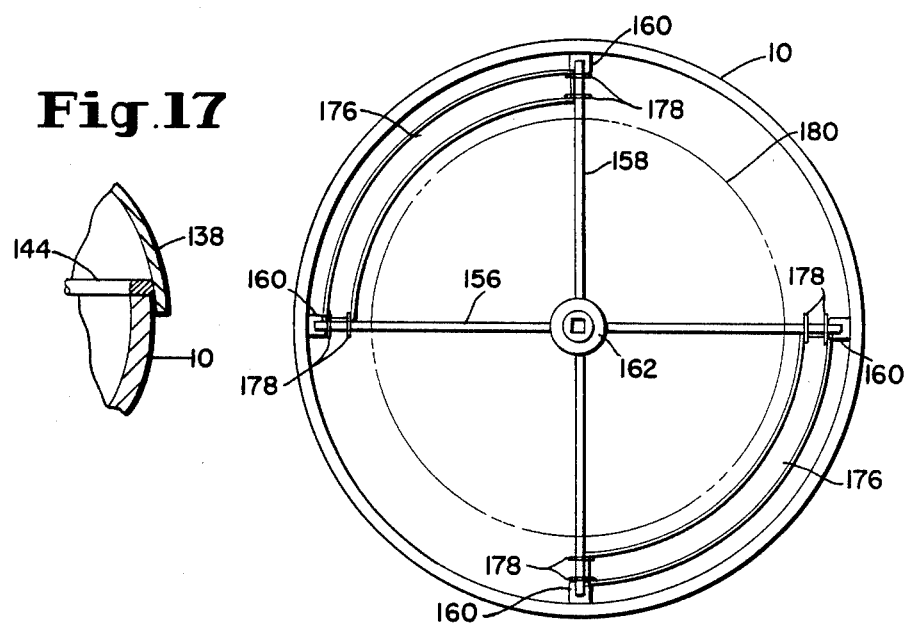

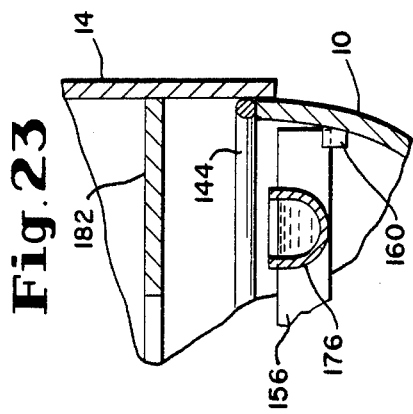
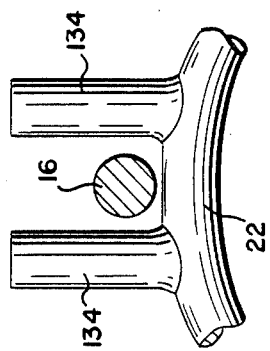
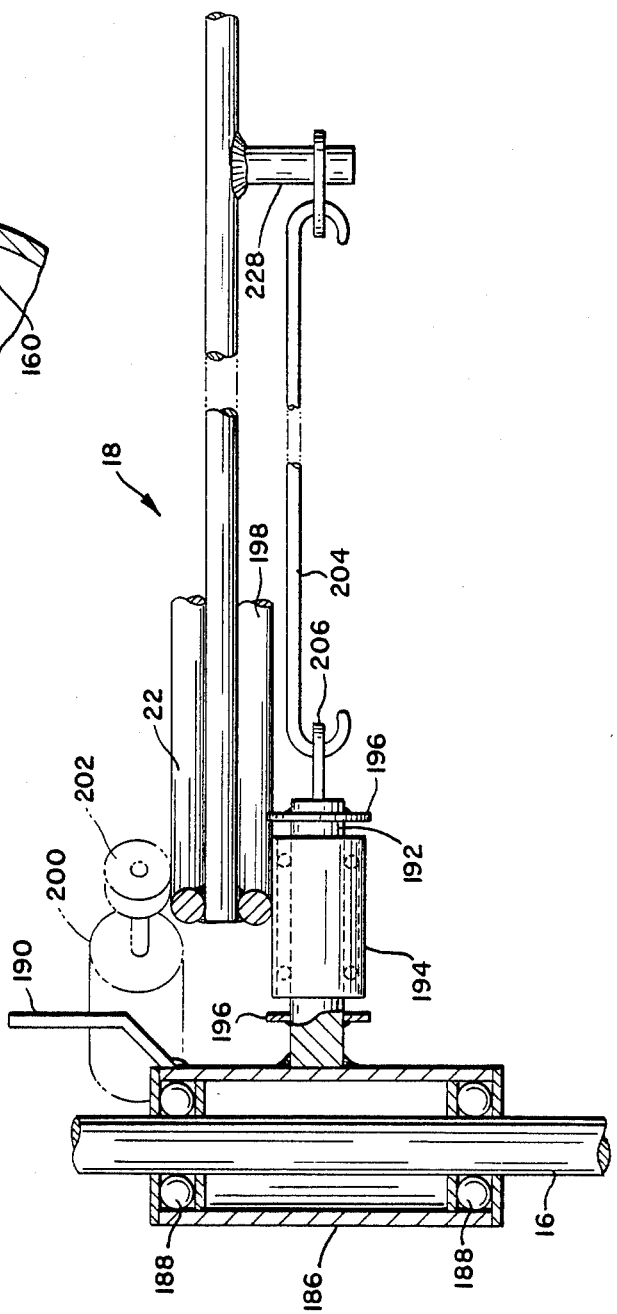
Fig.23
Fig.22
Fig.24

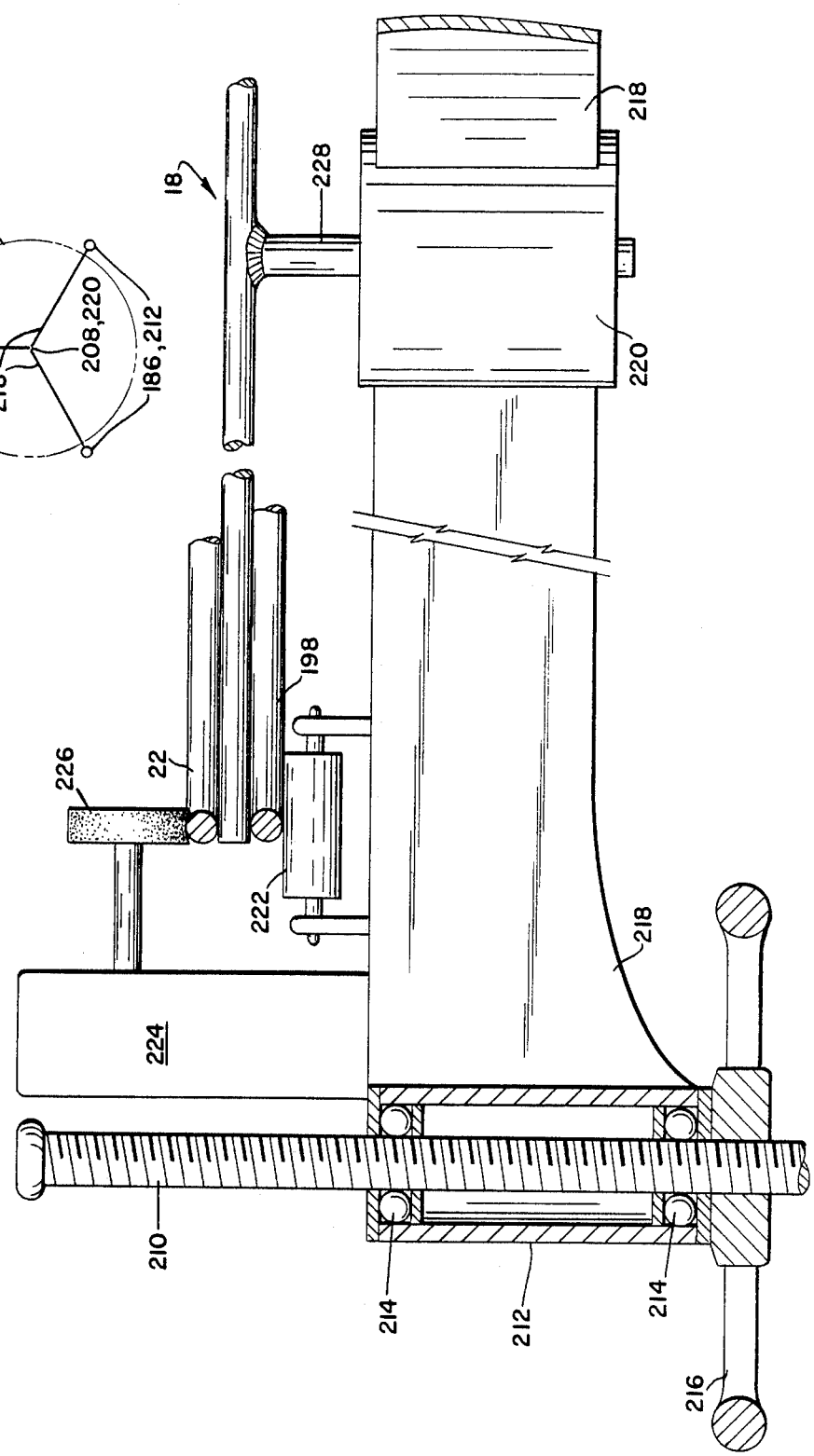

CAMPFIRE COOKER

BACKGROUND OF THE INVENTION

This invention relates to outdoor campfire and cooker structures and, more particularly, to an improved, multicomponent, multi-use assembly, the basic components of a tripod and grill structure, a fire bowl and a smoker. Components may be used alone or in combinations depending on the desired use. For example, the fire bowl may be used alone to provide a campfire. The tripod and grill structure may be used with the fire bowl or alone to provide a stable, outdoor cooking grill. The smoker attachment may be used alone or with the fire bowl to provide a smoker. Multiple accessories may be provided.

The enjoyment and satisfaction imparted by the campfire and outdoor cooking are desired by many. The present invention provides a most desirable feature in that it may be used at home as well as in the woods or at a campsite.

The prior art includes several disclosures of only some of the more important features and aspects of the present invention. For example, U.S. Pat. No. 955,140 issued Apr. 19, 1910 to G. E. Cronk shows a camping apparatus including a fire box surrounded by a collapsible tripod structure which supports a cooking surface over the fire box. The cooking surface is adjustable in height but only by spreading apart or pulling together the legs of the supporting tripod assembly. U.S. Pat. No. 4,146,010 issued Mar. 27, 1979 to J. H. Manska discloses an outdoor grill tripod including a grill suspended by chains attached to the tripod legs by slidable locks. Another tripod and grill assembly is shown in U.S. Pat. No. 4,120,280 issued Oct. 17, 1978 to H. L. Iverson et al. In this patent, the grill is disclosed as being adjustably suspended by a single chain threaded through a single pulley at the upper end of the tripod, the chain terminating in an adjustable, sliding lock attached to one of the tripod legs.

U.S. Pat. Nos. 3,152,536 issued Oct. 13, 1964 to D. D. Lucas and 4,538,589 issued Sept. 3, 1985 to D. W. Preston show height-adjustable grill assemblies suspended from a single post which is inserted into the ground adjacent the fire. A tree-supported device which may be used as a camper's torch or as a cooking apparatus is shown in U.S. Pat. No. 918,070 issued to J. F. Menge.

Smokers are well known and representative examples are shown in U.S. Pat. Nos. 4,213,381 issued July 22, 1980 to C. E. Ellis and 4,512,249 issued Apr. 23, 1985 to L. R. Mentzel. The former patent shows a multi-level smoker including a lower, centrally mounted deflector for drippings, which, unfortunately, only blocks the flow the heat upwardly into the smoker. The latter patent shows a smoker adaptor for kettle grills. U.S. Pat. No. 4,140,049 issued to W. G. Stewart shows a kettle type grill including a lid so that the device may be used as a smoker and a water tray or trough may be suspended internally of the cooker. However, the water tray is open to food products supported above it and thus the water in the tray will become fouled by drippings.

In outdoor cookers including a somewhat semispherical base or fire bowl, it is convenient to have a drain hole for rain water and/or other liquid debris in the bottom center of the bowl and such is shown in U.S. Pat. 4,553,524 issued Nov. 19, 1985 to D. R. Wheat et al.

Another handy and desirable feature of outdoor cookers is to provide a motor to rotate the cooking grill and this is shown in U.S. Pat. No. 3,298,301 issued Jan. 17, 1967 to J. U. Lowndes.

What the prior art fails to disclose is a multiple use campfire and cooker assembly which is easily converted from one use to another, includes a grill assembly which is adjustable in height yet very securely suspended from a tripod structure and may be used at home, for example, either on a deck or in a yard, as well as in the woods or at a campsite.

SUMMARY OF THE INVENTION

Accordingly, it is a principal object of the invention to provide an outdoor campfire and cooker assembly including a grill suspended from a tripod which may be used as a campfire, a cooking device or a smoker and which may be used at home or in the outdoors. It is another object of the invention to provide a campfire and cooker assembly including a grill suspended from a tripod in such a manner that the grill is extremely stable in that it will not rotate and swing freely and will not be tipped when heavy objects are placed away from the center the grill.

It is a further object of the invention to provide a campfire and cooker assembly having two or more cooking grill's.

Yet another object of the invention is to provide a campfire or cooker assembly with a suspended, cooking grill and solid plate or open mesh material inserts which may be placed on the grill.

It is yet another object of the invention to provide a campfire and cooking apparatus including a fire bowl with sockets for supporting a tripod and grill assembly.

It is an object of the invention to provide a campfire and cooker assembly including a fire bowl which is equipped with a peripheral, multiple ring structure which serves as a safety barrier in preventing one from touching the sides of a hot fire bowl and further provides a support for suitable accessories, such as a cutting board, and also a supporting surface for cooking utensils such as pots, pans, etc.

It is still another object of the invention to provide a campfire and cooker assembly including a fire bowl having sockets for supporting a tripod and grill structure, the sockets being affixed to the fire bowl such that a removable cover may be received on top of the fire bowl, the cover serving as a rain shield when the invention is not in use and/or for smothering the fire after use of the invention.

It is yet a further object of the invention to provide a campfire and cooker assembly including a removable, generally bell-shaped smoker attachment which may be used alone or in conjunction with the fire bowl.

Another object of the invention is to provide a campfire and cooker assembly including a smoker attachment which has open top water trays therein so arranged and configured so as not to interfere with heat rising from a fire thereneath and also being positioned so as not to be fouled or contaminated from drippings from foods in the smoker.

A further object of the invention is to provide a campfire and cooker assembly including a smoker attachment having a motor therein for rotating one or more grills rotatably supported within the smoker.

It is an object of the invention to provide a campfire and cooker assembly including a fire bowl with an adjustable height grill mounted over the fire bowl, the grill being mounted for rotation by a motor.

In general, the three major components of the invention include a fire bowl, a grill and structure for supporting the grill over the fire bowl and a smoker attachment. Further, multiple accessories are provided which enhance the qualities and versatility of the invention.

BRIEF DESCRIPTION OF THE DRAWINGS

Further and more complete objects and advantages of the invention will become readily apparent by reference to the following detailed specification, claims and drawings in which:

FIG. 12 is an elevation, section view taken along lines 12—12 of FIG. 10;

FIG. 13 is an enlarged scale, detail, fraction, section view of the upper, righthand portion of the fire bowl illustrated in FIG. 12;

FIG. 14 is an enlarged scale, plan view, similar to FIG. 4 but showing another embodiment of a locking device;

FIG. 15 is an enlarged scale, fraction, perspective view showing the top of the tripod structure illustrated in FIGS. 9 and 11;

FIG. 16 is an elevation view of the smoker attachment of the invention with certain parts broken away to show interior detail;

FIG. 17 is a detail, section, fraction view illustrating the fit of the smoker on the fire bowl of the invention;

FIG. 18 is a top, plan view of the fire bowl of the invention provided with structure for supporting one or more grills arranged internally of the smoker shown in FIG. 6;

FIG. 22 is an enlarged scale, detail view, partially in section, illustrating another embodiment or association of a grill edge with a tripod leg;

FIG. 23 is a view similar to FIG. 17 but drawn to an enlarged scale and showing a water tray or trough mounted within the combined smoker and fire bowl of the invention;

FIG. 24 is an elevation, partial section view of another embodiment of the invention showing structure for rotatably mounting a grill and an optional motor for rotating the grill;

FIG. 25 is similar to FIG. 24 but drawn to an enlarged scale and showing yet another embodiment of the invention; and FIG. 26 is a diagrammatic, top, plan view showing the grill support for the embodiments of the invention shown in FIGS. 24 and 25.

DESCRIPTION OF THE PREFERRED EMBODIMENTS

Figure 1:
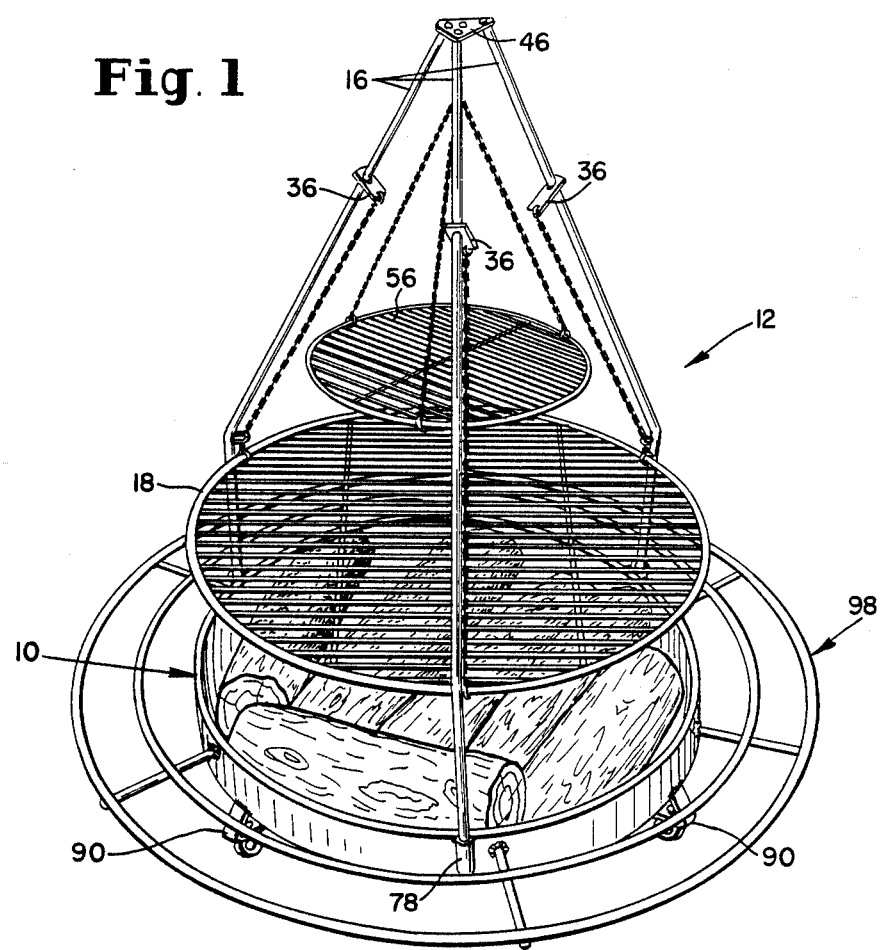
FIG. 1 is a perspective view of one embodiment of the invention.

Referring now to the drawings by reference character and, in particular, to FIGS. 1, 2, 3 and 16, the basic components of the improved campfire and cooker invention are illustrated, these being a fire bowl 10, a tripod and grill assembly 12 and a smoker attachment 14. The tripod and grill assembly 12 is mounted on fire bowl 10 in a manner to be described below.

Figure 4:
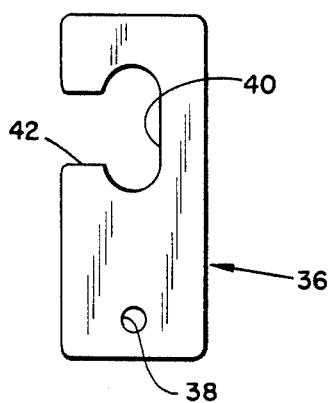
FIG. 4 is an enlarged scale, plan view of one sliding locking member used in supporting the grill or grills above the campfire or fire bowl of this invention.
Figure 2:
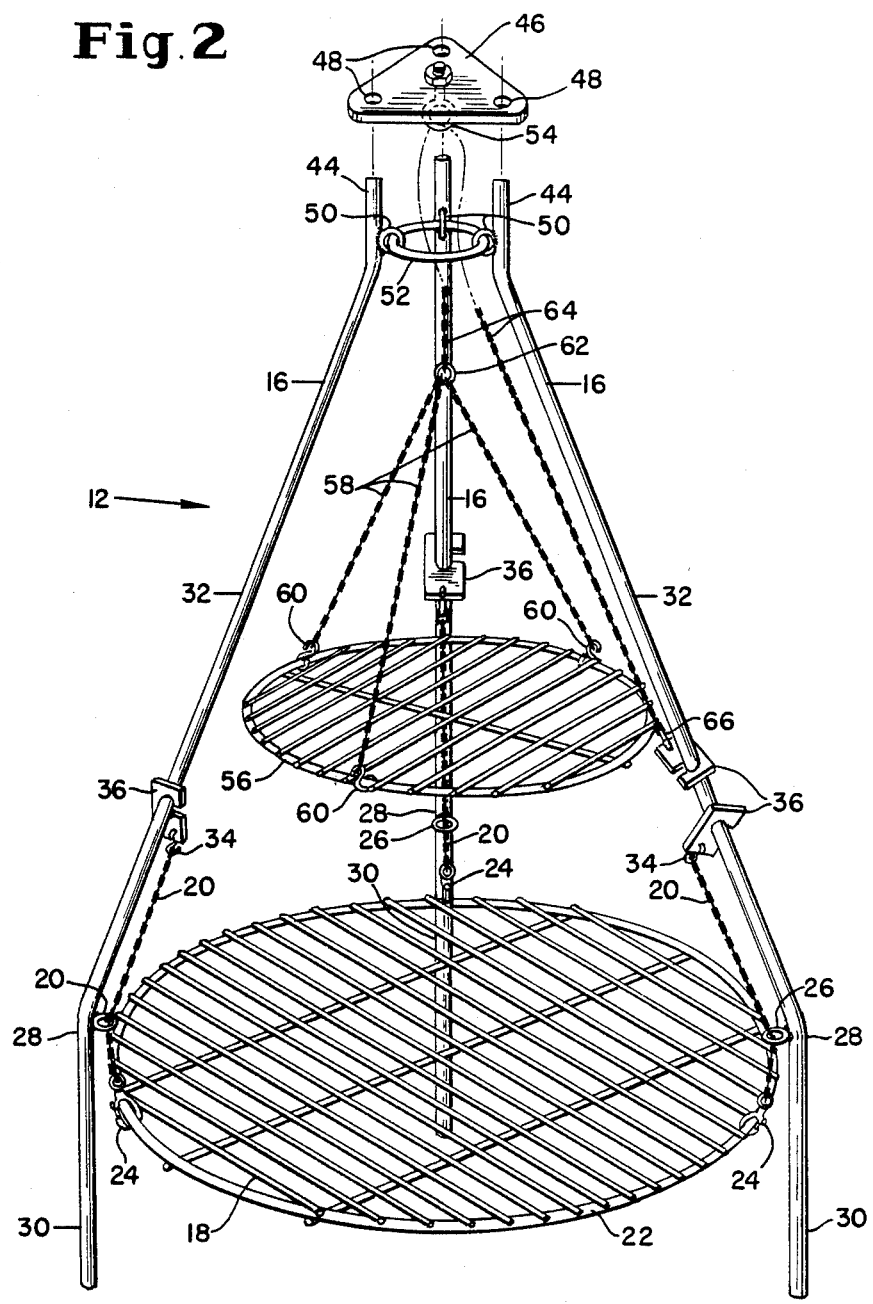
FIG. 2 is a perspective, partially exploded view of the preferred embodiment of a tripod and grill structure of this invention.

With further reference to FIG. 2, the tripod and grill assembly 12 includes three tripod legs 16,16,16 and a first or principal grill 18. Grill 18 is suspended from tripod legs 16 by flexible support members such as chains 20. The lower end of each chain is connected to the outer, peripheral ring 22 of grill 18 by a snap hook or S-hook 24. The length of chain 20 is passed upwardly through a capture and guide ring 26 which is welded or otherwise suitably attached to the junction 28 of a vertical member 30 and inturned member 32 of each tripod leg 16. The upper end of each chain 20 is attached, as by a snap hook or S-hook 34 to a slidable, locking bracket 36 which may be pivoted to a first position to slide along inturned member 32 and then release to lock the bracket 36 onto the inturned segment 32 of tripod leg 16. Clearly, adjustment of these brackets 36 as just explained allows one to adjust the heighth of main grill 18 at any desired point along the heighth of the vertical segments 30 of tripod legs 16. A preferred embodiment of sliding, locking bracket 36 is illustrated in FIG. 4. A hole 38 is provided for attachment of the snap hook or S-hook 34. The upper central portion of the locking bracket 36 is provided with an elongate slot 40 which receives an inturned segment 32 of tripod leg 16. Conveniently, slot 40 may be open to one side of the bracket 36 as is illustrated at 42. This permits removal of the bracket from the inturned segment if desired at any time.

A unique feature of this embodiment of the invention is the chain and guide ring structure for suspending grill 18. It has been found that this structure imparts an unexpected degree of stability to grill 18 in that the grill is prevented from swinging or rotating a heavy object such as a bucket full of water, may be placed further-more, away from the grill center and even very near the peripheral ring 22 of grill 18 and yet the grill will not tip at all. Thus, the structure as described provides a tripod and grill suspension assembly which is quite stable in use.

Returning again to FIG. 2, the upper end of each inturned segment 32 includes a relatively short length, generally vertically oriented stub portion 44 which receives an apertured blocking plate 46. The apertures 48 of plate 46 are spaced about 120° apart. Each stub portion 44 includes a mounting ring 50 through which is received a connecting ring 52. Accordingly, when it is desired to disassemble the tripod and grill assembly 12 with the locking plate removed, the three tripod legs may be slid around the connecting ring 52 so as to be adjacent one another and present a compact package for storage.

Locking plate 46 may include a central suspension ring 54 therebeneath. This ring 54 may be used to suspend an additional or supplemental grill 56. Grill 56 is suspended by three flexible supports such as chains 58 attached to the periphery of grill 56 in equispaced fashion by snap hooks or S-hooks 60. The upper ends of chains 58 are connected to a suspension ring 62 and another length of chain 54 extends from ring 62, upwardly and through suspension ring 54 and then downwardly to an additional locking bracket 36 which is slidable along a selected inturned segment 32 of a tripod leg 16. Chains 64 may be attached to the additional bracket 36 by a snap hook or S-hook 66.

Obviously, movement of this additional locking bracket 36 along an inturned segment 32 permits the additional grill 56 to be moved and set at any desired heighth.

In the embodiment of FIG. 2, each inturned segment 32 of tripod leg 16 is straight. If desired, these segments could be bowed in configuration, as is shown at 68 in FIG. 9.

Figure 5:
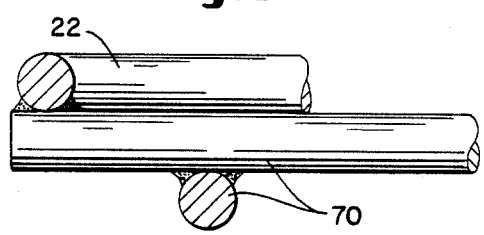
FIG. 5 is an enlarged scale, elevation fraction view of an outer edge of the grill of this invention.
Figure 6:
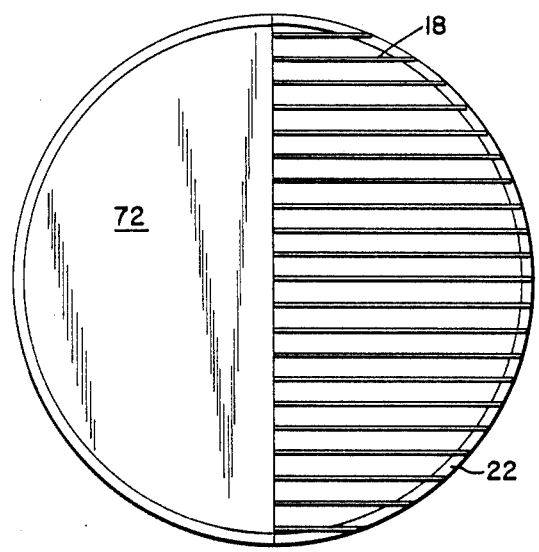
FIG. 6 is a plan view of the grill of this invention provided with a semicircular, solid plate insert.
Figure 7:
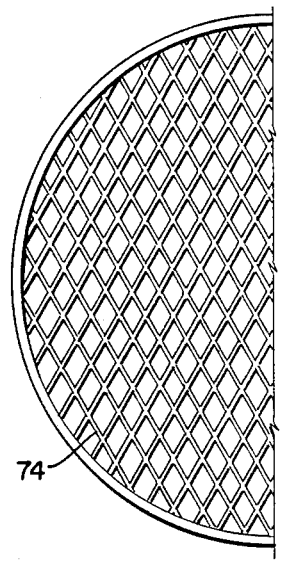
FIG. 7 is a plan view of an open mesh, semicircular screen insert which may be used with the grill of this invention.

Referring now to FIG. 5, it is seen that the peripheral ring 22 of grill 18 is mounted on top of the crossbars 70 forming the main body of grill 18. This structure assists in retaining items on the grill and substantially preventing any items from sliding off of the main grill 18. With reference to FIGS. 6 and 7, this structure also provides an arrangement for ready insertion of accessories such as a semicircular, flat, solid plate 72 (FIG. 6). Alternatively, the insert could be of open mesh material which may be a diamond configuration as is shown at 74 in FIG. 7. Clearly, these two plate inserts provide further versatility in the type of cooking that might be done on the invention. Further, either of the inserts 72 or 74 could be of any circular segment configuration and not necessarily semicircular as is shown in the figures.

Figure 8:
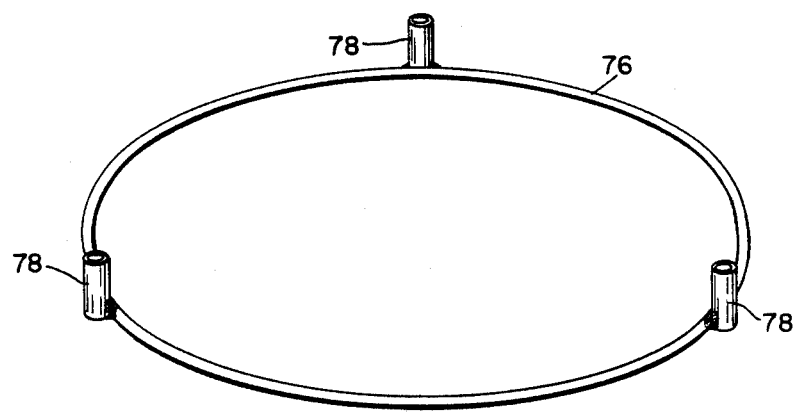
FIG. 8 is a perspective view of a ground supported ring provided with sockets for mounting the tripod and grill assembly of this invention and this supporting ring may be used in place of the fire bowl of this invention.

Referring now to FIGS. 2 and 8, the tripod and grill assembly 12 might be used alone over a suitable fire (not shown). However, when used alone, a ground supported base could be provided equispacing of the tripod legs 16. A suitable base is shown in FIG. 8 and includes a ground supported ring 76 provided with a plurality of generally vertically oriented sockets 78 spaced 120° degrees apart around the outer periphery of ring 76.

Figure 3:
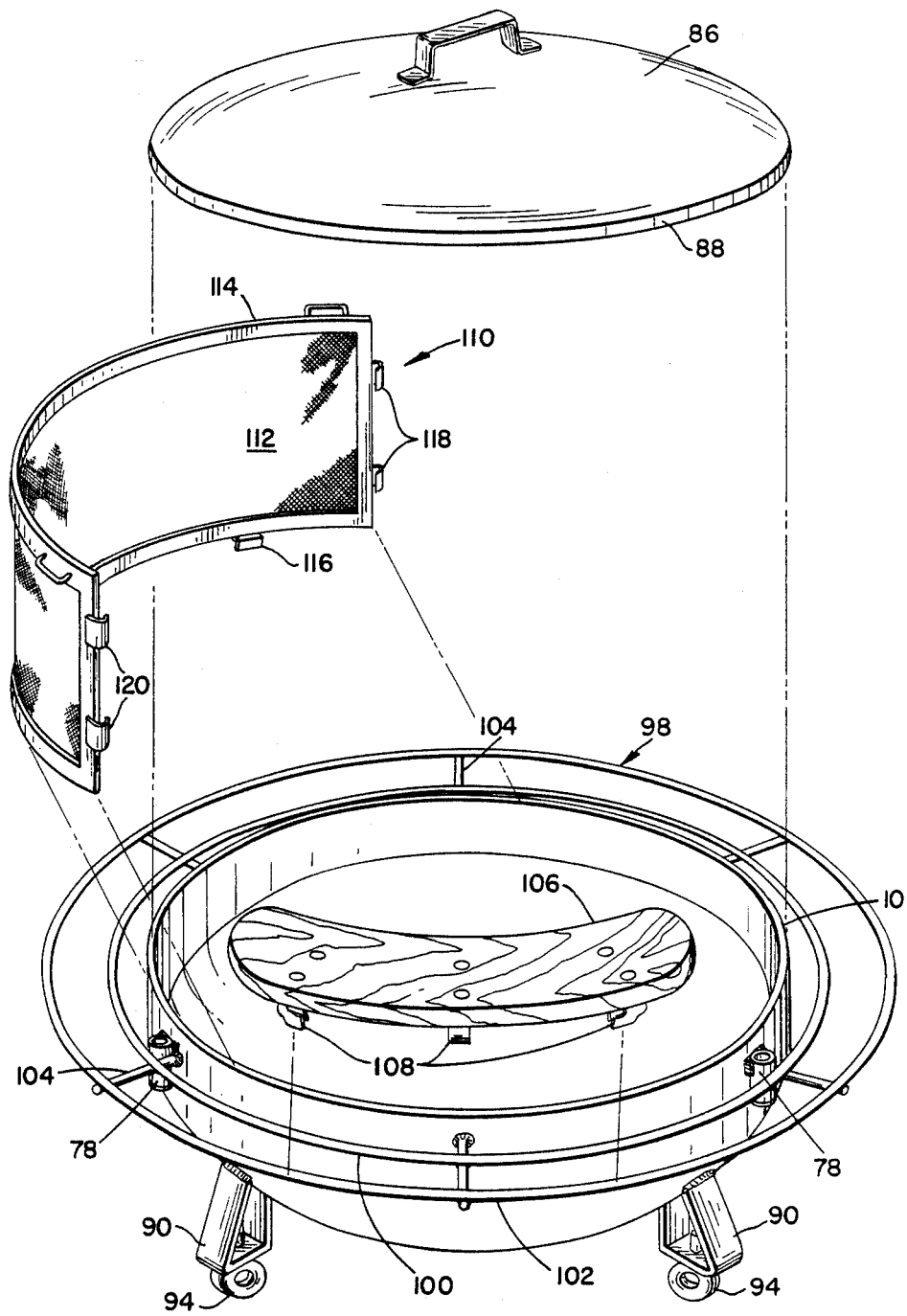
FIG. 3 is a partially exploded, perspective view of the fire bowl component of the invention, the view further illustrating cover, wind screen and cutting board accessories useful with the fire bowl.

Turning now to FIG. 3, the fire bowl 10 of the invention is shown having the same mounting sockets 78 arranged around the periphery thereof in equispaced fashion. The sockets 78 are dimensioned to receive the lower ends of the vertical segments 30 of tripod legs 16 as is shown in FIG. 1. A detail view of one socket 78 is shown in FIG. 13. The lower end of the socket 78 is closed by a stop 80 having a central drainage opening 82 formed therethrough. Conveniently, each stop 80 can be a washer which is welded to the bottom end of the socket 78. Of course, the primary function of the drainage hole 82 is to allow any rainwater to drain out of the socket. Referring to FIGS. 3, 12 and 13, it will be noted that the upper end of each socket 78 is spaced a predetermined distance below the upper peripheral edge 84 of fire bowl 10. This structure is provided so that a cover 86 (FIG. 3) may be placed on edge 84 of fire bowl 10 with the depending, peripheral flange 88 of cover 86 fitted over the outer upper edge 84 of fire bowl 10 without creating an interference fit between the sockets 78 and the flange 88 of cover 86.

Figure 10:
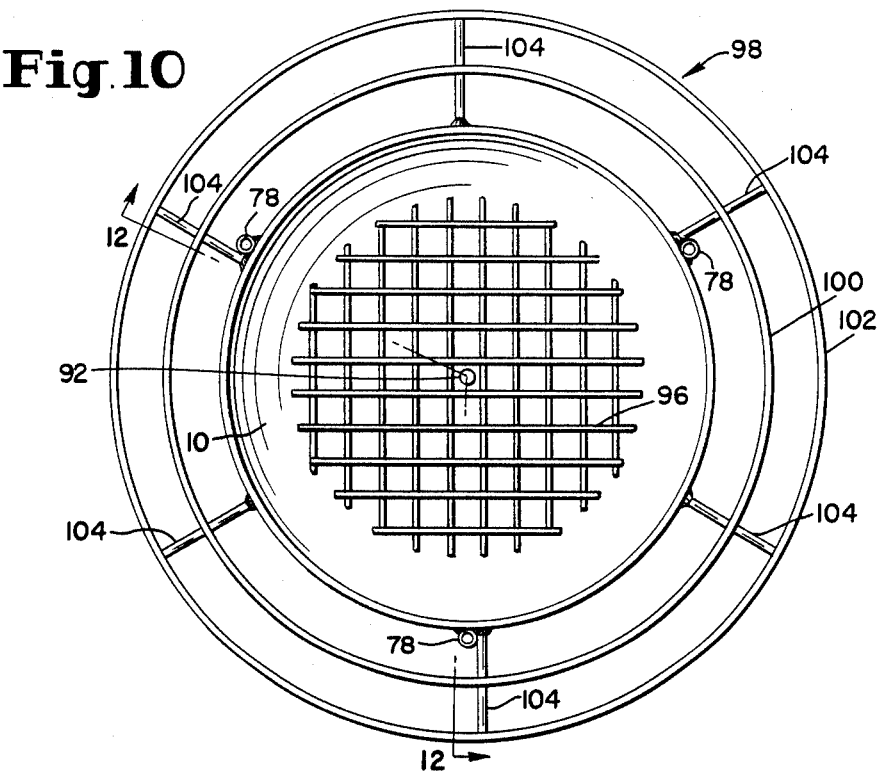
FIG. 10 is a top, plan view of the fire bowl of this invention with the grill and tripod structure removed.
Figure 11:
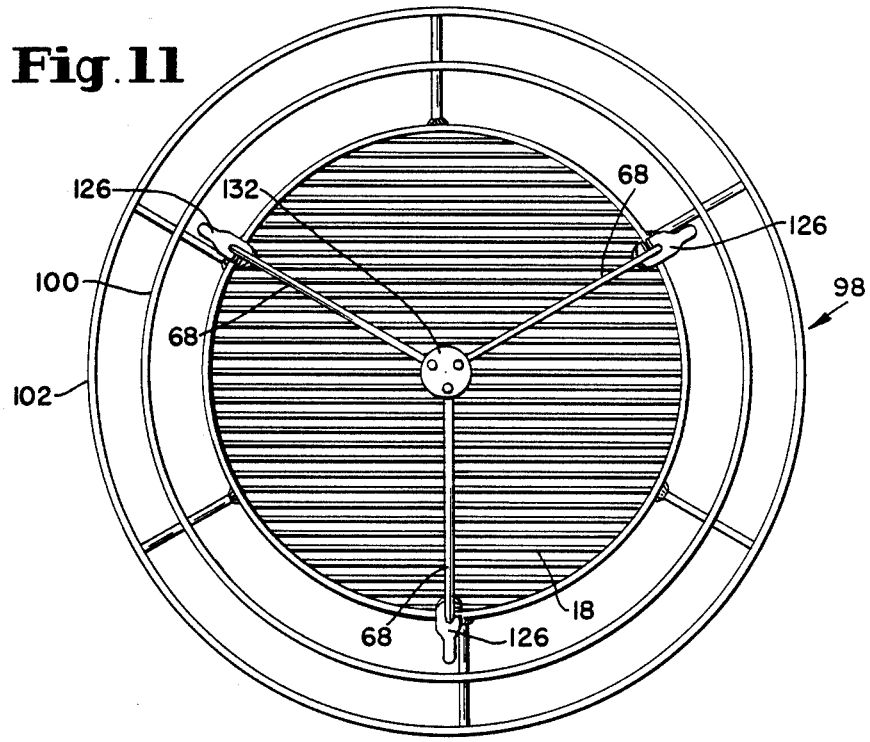
FIG. 11 is a top, plan view of the embodiment of the invention illustrated in FIG. 9.

The bottom of fire bowl 10 may be provided with equispaced support legs 90 and a central drainage hole for opening 92 (FIG. 12). The support legs 90 may be provided with otherwise conventional casters 94 (FIG. 3). Also, a removable fire grate 96 may be placed within fire bowl 10 as is illustrated in FIG. 10.

Returning to FIG. 3, fire bowl 10 is provided with an integral, concentric ring platform 98 mounted on the upper, external periphery of fire bowl 10. In a preferred embodiment, concentric ring platform 98 is made up of two concentric rings 100,102 supported by radially extended support rods 104. As is shown in FIG. 13, preferably the inner ring 100 is made of ⅜ inch stock and the outer ring 102 is made of ½ inch stock. This imparts a better degree of structural rigidity in the concentric ring platform 98.

The concentric ring platform 98 performs two very important functions. First, it provides a safety barrier in that it will effectively prevent a person from touching the side of the fire bowl 10 when in use. Secondly, it provides a support platform for utensils and additional accessories, such as a cutting board 106 which may be provided with otherwise conventional spring clips 108 therebeneath for mounting board 106 on platform 98. Board 106 is clearly shown in FIG. 3.

Fire bowl 10 may be of any suitable material but, conveniently, it is a commonly manufactured product known as a tank head. This product is used in the manufacture of steel tanks to form the ends. These tank heads are manufactured by several companies and, commonly, the material used is 3/16 inch ASME plate steel.

Returning again to FIG. 3, a wind screen 110 is provided, made up of mesh screen 112, secured to a peripheral frame 114. Screen 110 may be detachably secured to edge 84 of fire bowl 10 as by bottom mounting clips 116 and to two of the tripod legs 16 as by pairs of side clips 118 and 120. An inspection of FIG. 3 reveals that the clips 118 are mounted in staggered relationship with respect to clips 120 on the other side of the wind screen 110. This permits a second screen to be mounted adjacent to the first screen with abutting edges and clips engaging the same tripod legs but without the clips interfering with one another.

A second embodiment of the tripod and grill structure of the invention is illustrated in FIGS. 9, 11, 14 and 15. In this case, the outer ring 22 of grill 18 includes three equispaced guide and capture rings 122,122,122 through which the tripod legs 16 are inserted. The grill 18 is suspended by flexible chains 124 attached to rings 122 and to slidable, locking brackets 126 which function in the same manner as brackets 36 (FIG. 4). However, in this embodiment, the brackets 126 have a convenient, outwardly extending handle 128, as illustrated in FIG. 14. It has been found that this grill suspension system imparts the same degree of stability to the grill 18 as in the first embodiment, which was discussed in detail above.

As best seen in FIG. 15, the upper, bowed ends 68 of tripod legs 16 each include a short, vertical stub portion 130 inserted through a capture plate 132 having equi-spaced apertures therein. When the tripod is removed and disassembled for storage, the three bowed portions 68 and thus the legs 16 may be brought together, against one another, thus to provide a compact assembly for storage.

A sight variation of this embodiment of the invention is illustrated in FIG. 22. Instead of closed rings 122 on ring 22 of grill 18, a two-tined fork structure is provided having tines 134, 134 embracing an associated tripod leg 16.

Turning now to FIGS. 16–21 and 23, the details of the smoker 14 of the invention will be discussed. As can be seen in FIG. 16, smoker 14 has a main shell body with a closed top and an open bottom and is made up of an upper, generally cylindrical, dome topped body 136 and an integral lower peripheral skirt 138. An otherwise conventional drive motor 140 is mounted on the top of upper body 136 and its function will be explained in detail below. In order to permit the use of thin gauge metal for constructing the shell body of smoker 14, a circular, peripheral stiffener 142 is welded to the upper, inner portion of body 136 and a lower, internal stiffener rod 144 is mounted at the lower, internal portion of skirt 138. As stated above, smoker 14 could be used alone and simply placed over a fire. Or, the smoker may be used with fire bowl 10 and mounted thereupon as shown in FIG. 17. The lower stiffener 144 then serves a second function, and that is to provide a mounting seat for placement of the smoker over fire bowl 10. This arrangement is also seen in FIG. 23.

Other components of the smoker 14 may include otherwise conventional vents or dampers 146 at the top of body 136, a pair of inspection doors 148,150 and a lower, fire door 152 for access through the lower skirt 138. Each of the doors 148,150 may include a temperature gauge 154. In use, the internal, upper portion of body 136 will be at a higher temperature than the lower portion and this is reflected at FIG. 16 by the indications of the respective temperature gauges 154. The provision of two doors is an advantage in that the provision reduces heat loss; only one door needs to be opened at a time to access the interior of smoker 14.

If desired, the interior of smoker 14 may be lined with a suitable insulation material (not shown).

Figure 19:
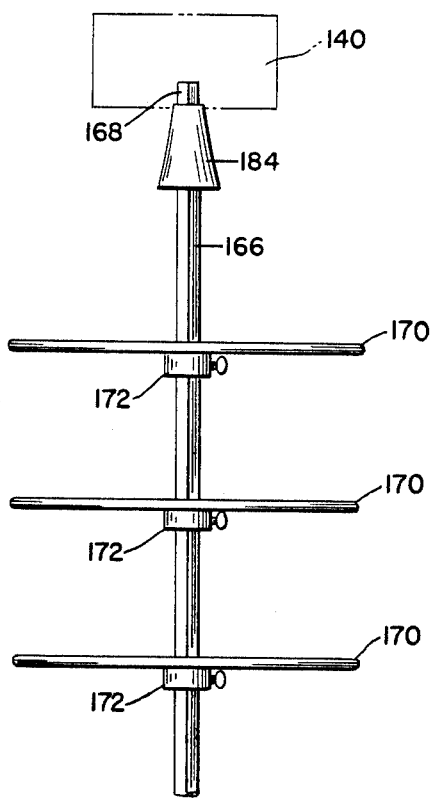
FIG. 19 is a detail, elevation view showing three grills mounted on a rotatable post received within the smoker and driven by a motor mounted on top of the smoker shown in FIG. 16.
Figure 20:
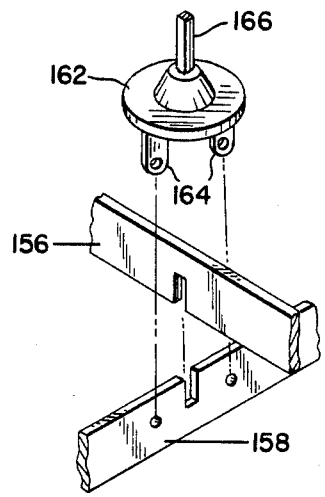
FIG. 20 is an exploded, detail view showing components for rotatably mounting the post and grill structure shown in FIG. 19. these components being mounted within the fire bowl of the invention.
Figure 21:
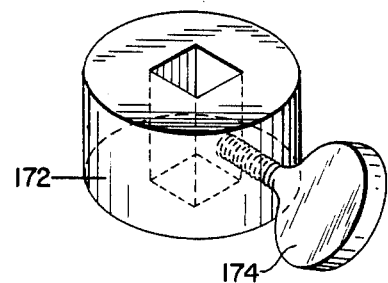
FIG. 21 is an enlarged scale, detail, perspective view showing a device for adjustably supporting the grills along the post illustrated in FIG. 19.

Turning now to FIGS. 18 and 20, a strut assembly including struts 156 and 158 is received within fire bowl 10 and supported by four mounting blocks 160. Struts 156 and 158 are matingly slotted as shown in FIG. 20 and a rotatable bearing shaft support 162 is mounted centrally on the strut assembly. Support 162 includes depending ears 164 which are secured to the lower strut 158 thus trapping the upper strut 156, thus to provide a stable support for support 162. As seen in FIGS. 19 and 20, support 162 has a rotatable, generally vertically oriented shaft 166 received therein which, in a preferred embodiment, is made of square stock, the upper end 168 thereof being received within a suitable, otherwise conventional drive (not shown) of motor 140. A number of food support grills 170 are mounted on shaft 166 and are adjustable therealong by collars 172, each having a thumbscrew 174 therethrough (FIGS. 21) for securing the collar support 172 at a selective location along shaft 166.

As can be seen in FIG. 18, the struts 156,158 support two or more water trays 176, the ends of which are provided with support hooks 178, fitted over the struts 156,158. The arrangement of parts is such that the water trays are located beneath lower skirt 138 outside of the junction 180 between skirt 138 and upper body 136. With this construction and during use of the smoker, drippings from the food being smoked are prevented from falling into trays 176 and thus fouling of water within the trays 176 is effectively prevented.

An alternative construction for accomplishing the same result is illustrated in FIG. 23. In this embodiment, the smoker 14 does not include the lower skirt 138. In this embodiment, the smoker simply includes a domed top, generally cylindrical shell. However, within the lower end thereof and above fire bowl 10, there is provided a peripheral shelf 182 which is dimensioned to effectively cover a water tray 176 and thus prevent food drippings from falling into and fouling the water within a tray 176.

Returning to FIG. 19, the upper end 168 of shaft 166 may be provided with a cone shaped guide 184 which simply assists in the proper insertion of end 168 into the outward drive of motor 140 when the parts are assembled for use.

Figure 9:
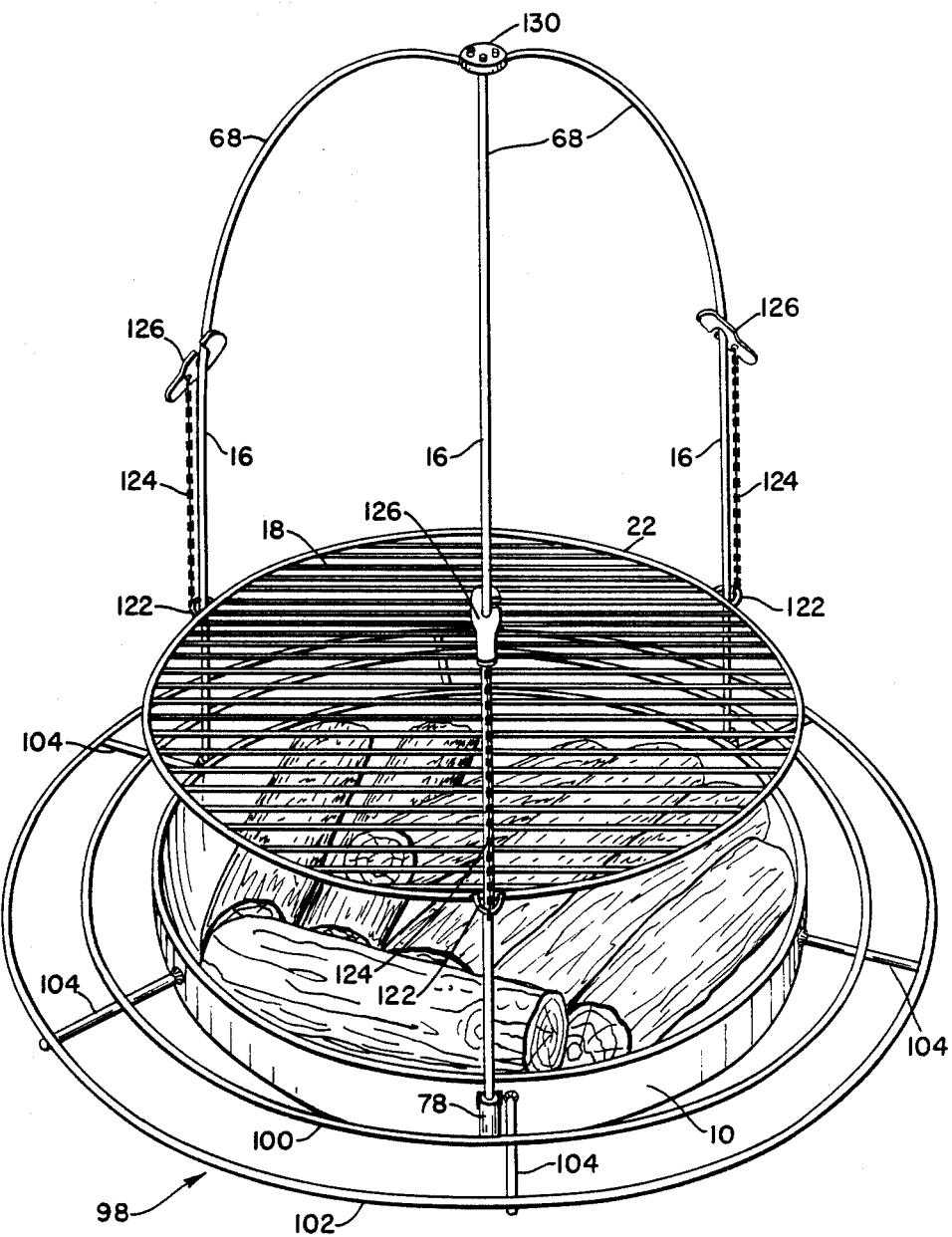
FIG. 9 is a perspective view similar to FIG. 1 but drawn to an enlarged scale and showing another embodiment of the invention.

Another embodiment of a grill support assembly associated with tripod legs 16 is illustrated in FIGS. 24 and 26. Each leg 16 is provided with a sleeve support 186 having a bearings 188 so that the sleeve 186 may ride up and down a leg 16. At the upper end of sleeve 186 is a connector 190 to which is attached either the lower end of chain 20 (FIG. 2) or the lower end of chain 124 (FIG. 9). Sleeve 186 includes an inwardly directed stub shaft 192 upon which is mounted a rotatable support sleeve 194 which is captured between elements 196. Now, in this embodiment, main grill 18 includes a additional, lower, outer peripheral ring 198 which rides on sleeve 194. If desired, a suitable, otherwise conventional motor 200 having an output drive wheel 202 may be provided to engage ring 22 of grill 18 and rotate the same. The motor could be affixed to sleeve 186 by suitable brackets (not shown).

To stabilize the sleeves 186, since they are each free to move up and down a tripod leg 16 and rotate therearound, a three-legged stabilizer 204 (FIG. 26) is provided. In this embodiment, the inner end of stub shaft 92 has a ring 206 for receiving a hook end of one of the stabilizer legs 204. The opposite, hook end of each stabilizer leg 204 is secured through a center, junction ring 208.

With reference to FIGS. 25 and 26, another embodiment of the invention combining a rotatable support for main grill 18 will now be discussed. Instead of a tripod structure, three externally threaded support rods, one of which is indicated at 210 at FIG. 25, are received within the sockets 78 of fire bowl 10. Each rod includes a sleeve support 212 having bearings 214 therewithin so that the sleeve 212 may ride up and down the support rod in frictionless engagement therewith. Each sleeve 212 is adjusted upwardly and downwardly by means of a handwheel 216 threaded to a rod 212, the lower end of the sleeve 212 resting on the handwheel 216. In this embodiment, the legs of the three-legged support stabilizer 218 are affixed directly to a sleeve 212 and are joined centrally at a hub 220.

As seen in FIG. 25, the outer ends of the three-legged support stabilizers are provided with a roller support 222 upon which main grill 18 having a lower, outer peripheral ring 198, rests. A motor 224 with an output drive wheel 226 may be mounted on one of the legs of support stabilizers 218 and positioned and dimensioned so as to engage upper ring 22 of grill 18 and rotate the same.

In both FIG. 24 and FIG. 25 embodiments, grill 18 may include a depending centering pin 228 extended into ring 208 (FIG. 24) or hub 220 (FIG. 25) to retain grill 18 in place, particularly when it is rotated.

There is a further embodiment illustrated by FIG. 25 wherein only one threaded support rod 210 is provided and only one of the legs of stabilizer 218 is provided with a sleeve 212. The other two legs of stabilizer 218 end just beyond the roller support 222 for the ring 198 of grill 18. When not in use, the entire grill support and grill 18 may be simply rotated away from the fire bowl about the one rod 210.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description and all changes that come within the meaning and range of equivalency of the claims are therefore intended to be embraced therein.

I claim:

1. Cooking apparatus comprising a tripod structure means including at least three legs joined at the top thereof; a grill; and means for adjustably suspending said grill from each leg of said tripod stucture; each of said tripod legs including a lower, generally vertical segment and an inturned, upper segment; each of said adjustably suspending means including a flexible support member having an upper and a lower end, a capture and guide ring mounted at the junction of the vertical and inturned segments, said flexible support member being threaded through said capture and guide ring, means for attaching the flexible member lower end to the grill and slidable locking bracket means for attaching the flexible support member upper end to the inturned member and being pivotal to a first position to slide along the inturned member, thus to adjust the heighth of the grill, and to a second position locked onto the inturned member thus to suspend and maintain the grill at a selected heighth.

2. The apparatus as claimed in claim 1 wherein each tripod leg inturned member has an upper end including a relatively short length, generally vertically oriented stub portion, said apparatus further comprising a locking plate and means defining equispaced apertures in said locking plate, said leg stub portions being received in said apertures thus to array said legs in tripod fashion.

3. The apparatus as claimed in claim 1 wherein each tripod leg inturned member has an upper end including a mounting ring thereon, there further being a connecting ring received through said mounting rings whereby the tripod legs may be slid around the ring to be adjacent one another, thus to collapse the tripod structure for storage.

4. The apparatus as claimed in claim 2 wherein said locking plate includes a suspension ring mounted on a lower surface thereof from which an additional grill or the like may be suspended.

5. The apparatus as claimed in claim 4 further comprising an additional grill and flexible means for suspending said additional grill above said grill, said additional grill flexible suspending means having an end threaded through said locking plate suspension ring and adjustably attached to one of said tripod legs.

6. The apparatus as claimed in claim 5 wherein said additional grill flexible suspending means end includes a slidable locking bracket means attached to a selected leg inturned member, and being pivotal to a first position to slide along the inturned member, thus to adjust the heighth of the additional grill, and to a second position locked onto the inturned member thus to suspend and maintain the additional grill at a selected heighth, from said locking plate suspension ring.

7. The apparatus as claimed in claim 6 wherein additional grill suspending slidable locking bracket means includes a central aperture means for receiving said selected leg inturned member and an open slot means defined between said aperture and an edge of said additional grill slidable locking bracket means whereby said additional grill slidable locking bracket means may be removed from said selected leg inturned member.

8. The apparatus as claimed in claim 1 wherein each said slidable locking bracket means includes a central aperture means for receiving an associated leg inturned member and an open slot means defined between said aperture and an edge of the slidable bracket means whereby the slidable locking bracket means may be removed from its associated leg inturned member.

9. The apparatus as claimed in claim 1 wherein each leg inturned member is straight.

10. The apparatus as claimed in claim 1 wherein each leg inturned member is of bowed configuration.

11. The apparatus as claimed in claim 1 wherein said grill includes an outer, peripheral ring located above the upper surface of the main body of the grill whereby items placed on the grill are substantially prevented from sliding off the grill.

12. The apparatus as claimed in claim 1 wherein said grill is circular in configuration, said apparatus further. comprising at least one flat plate insert means of predetermined, circular segment configuration, for placement on said grill.

13. The apparatus as claimed in claim 12 wherein said plate insert means is solid.

14. The apparatus as claimed in claim 12 wherein said plate insert means is made of open mesh material.

15. The apparatus as claimed in claim 1, further comprising a ground supported base of predetermined dimensions and a plurality of generally vertically oriented socket means affixed to and generally equispaced about said ground supported base for receiving the leg vertical segments of said tripod structure means.

16. The apparatus as claimed in claim 1, further comprising fire bowl means and a plurality of socket means affixed to and generally equispaced about the external periphery of said fire bowl, for receiving the lower ends of said leg vertical segments of said tripod structure means.

17. The apparatus as claimed in claim 16 wherein each said socket means is generally vertically oriented and includes a support stop at a lower end thereof, there further being means defining a drainage opening through each of said support stop means.

18. The apparatus as claimed in claim 16, further comprising cover means for said fire bowl, said cover means including an outer depending peripheral means for receiving the upper peripheral edge of said fire bowl.

19. The apparatus as claimed in claim 18 wherein said cover means depending edge is dimensioned to fit over and outside of said fire bowl upper peripheral edge, each said socket means being affixed to said fire bowl peripheral edge a sufficient distance beneath the upper edge so as to avoid an interference fit with said cover means depending edge.

20. The apparatus as claimed in claim 16 wherein said fire bowl further includes drain means defined through a lower portion therein.

21. The apparatus as claimed in claim 16 wherein said fire bowl further includes fire grate means received therewithin.

22. The apparatus as claimed in claim 16 wherein said fire bowl includes a plurality of bowl support leg means affixed therebeneath in equispaced fashion.

23. The apparatus as claimed in claim 22 wherein each said bowl support leg means includes a caster mounted therebeneath.

24. The apparatus as claimed in claim 16 wherein said fire bowl is circular in configuration and further comprises integral concentric ring platform means mounted to the upper external periphery of said fire bowl.

25. The apparatus as claimed in claim 24 wherein said platform means comprises a plurality of radially extended support rods and at least two concentric platform rings affixed to said support rods.

26. The apparatus as claimed in claim 16, further comprising circular segment wind screen means detachably mounted to said fire bowl and two of said tripod structure means legs.

27. The apparatus as claimed in claim 24, further comprising a cutting board of predetermined configuration and means for detachably mounting said cutting board onto said concentric ring platform means.

28. Cooking apparatus comprising a tripod structure means including at least three legs joined at the top thereof; a grill; means for adjustably suspending said grill from each leg of said tripod structure; each of said tripod legs including a lower, generally vertical segment and an inturned, upper segment; and guide and capture means mounted on said grill and associated with each of the tripod structure means legs; each of said adjustably suspending means including a flexible support member having an upper and a lower end; means for attaching each flexible member lower end to an associated guide and capture means; and slidable, locking bracket means for attaching each flexible member upper end to an associated tripod structure means leg and being pivotal to a first position to slide along a tripod structure means leg, thus to adjust the heighth of the grill, the guide and capture means riding along the leg vertical segments, and to a second position locked onto the leg, thus to suspend and maintain the grill at a selected heighth.

29. The apparatus as claimed in claim 28 wherein each said guide and capture means comprises a closed ring encircling an associated leg vertical segment.

30. The apparatus as claimed in claim 28 wherein each said guide and capture means comprises an open, generally two-tined fork with the tines embracing an associated leg vertical segment.

31. The apparatus as claimed in claim 28, further comprising fire bowl means and a plurality of socket means affixed to and generally equispaced about the external periphery of said fire bowl, for receiving the lower ends of said leg vertical segments of said tripod structure means.

32. Cooking apparatus comprising a tripod structure means including at least three legs joined at the top thereof; a grill; and means for adjustably supporting said grill from each leg of said tripod structure; each of said tripod legs including a lower, generally vertical segment and an inturned, upper segment; each of said means for adjustably supporting said grill from each tripod leg including a grill support means adapted to ride up and down the tripod leg vertical support means, and a flexible support member having an upper and a lower end, the lower end being attached to an associated grill support means, and slidable, locking bracket means for attaching the flexible member upper end to the leg inturned member and being pivotal to a first position to slide along the inturned member, thus to adjust the heighth of the grill support means and grill, and to a second position locked onto the inturned member thus to suspend and support the grill at a selected heighth.

33. The cooking apparatus as claimed in claim 32 wherein each said grill support means comprises sleeve means embracing a leg vertical segment and movable therealong and an inwardly directed support stub which receives a portion of the exterior periphery of the grill.

34. The cooking apparatus as claimed in claim 33 wherein each support stub is provided with a rotatable sleeve support for the grill periphery whereby the grill may be rotated in a generally horizontal plane on the grill support means.

35. The cooking apparatus as claimed in claim 34, further including motor means for rotating said grill.

36. The cooking apparatus as claimed in claim 34 wherein means are provided for preventing each sleeve means from rotating about its associated legs, whereby the support stubs are always directed towards a central, common point.

37. The cooking apparatus as claimed in claim 36 wherein said rotation prevention means comprises a three legged stabilizer having three leg outer ends attached to the three support stubs.

38. The cooking apparatus as claimed in claim 32, further comprising fire bowl means and means for attaching the lower ends of the leg vertical segments to the upper periphery of the fire bowl means.

* * * * *